United States Patent Office 3,301,887
Patented Jan. 31, 1967

3,301,887
PRODUCTION OF CYCLIC UNSATURATED ALCOHOLS AND BORATE ESTERS
Isidor Kirshenbaum, Westfield, Ralph M. Hill, Mountainside, and Jeffrey H. Bartlett, New Providence, N.J., assignors to Esso Research and Engineering Company, a corporation of Delaware
No Drawing. Filed Apr. 25, 1960, Ser. No. 24,239
13 Claims. (Cl. 260—462)

This invention relates to unsaturated alcohols and to the preparation of such alcohols from the corresponding olefins.

In particular, this invention relates to a novel process for preparing an unsaturated alicyclic alcohol by liquid phase oxidation of an alicyclic olefin in the presence of boric acid or a boric acid compound.

This application is a continuation-in-part of application Serial No. 860,320, filed December 18, 1959 now abandoned.

Unsaturated cyclic alcohols are valuable for many chemical applications. For instance they find use in resin formulations and may be esterified with a carboxylic acid to provide valuable plasticizers which either before or after blanding may be epoxidized or subjected to cross-linking reactions. These alcohols may also be converted to glycols, triols and diolefins, or treated with caustic, e.g. KOH, to yield desirable acids or derivatives.

The term "boric acid compound" is used herein to include boric acid, compounds which generate boric acid upon contact with water, i.e. $B_2O_3$, and esters of boric acid and a $C_1$ to $C_5$ alcohol, e.g. trimethylborate, triethylborate, tri-n-butyl borate, etc. Of these the borate esters are preferred. Alkyl substituted boric acids may also be used but they are not as desirable as $H_3BO_3$. Hence, the term "boric acid compound" refers to compounds selected from the group consisting of boric acid and compounds which generate boric acid upon contact with water at reaction temperatures, e.g., 100° to 250° C.

Heretofore, attempts to oxidize alicyclic olefins with molecular oxygen, e.g. air, have resulted in a product mixture comprising largely epoxides and high molecular weight condensation products. See, for example, British Patent 729,983.

It has now been discovered that if boric acid or a boron compound hereinbefore disclosed is present during liquid phase oxidation of an alicyclic olefin with molecular oxygen, high selectivity to the corresponding alcohol can be obtained with little or no formation of either low or high molecular weight products. The product may be recovered as the corresponding borate ester. Subsequent hydrolysis will yield the unsaturated alicyclic alcohol or transesterification with another acid will yield an unsaturated ester of desired composition.

This reaction may be carried out without the aid of oxidation catalysts. However, it is within the scope of the invention to employ an oxidation catalyst such as catalysts containing manganese or cobalt in the form of their salts or oxides, e.g. cobalt naphthenate, managanese acetate, etc., preferably in amounts of about 0.001 to 0.1 mole catalyst/mole of olefin feed. Copper, iron, nickel, platinum, silver, and palladium salts or compounds may also be utilized. Where it is desirable to increase reaction rates, a halogen containing catalyst may be used, particularly inorganic bromide (e.g. ammonium bromide, managanese bromide, HBr). Although less desirable, the corresponding chlorides and iodides may also be utilized. Bromide (and other halide) concentrations of 0.1 to 10 wt. percent (calculated as the halide and based upon the cyclo olefin) may be used, although preferred concentrations when using bromide additives are 0.5 to 2 wt. percent. Other additives that may be present to advantage during the oxidation in the presence of boric acid include acids such as acetic acid. With feedstocks that are more difficult to oxidize it may also be advantageous to introduce small amounts of oxidation initiators such as peroxides, hydroperoxides, and ketones such as methyl ethyl ketone, cyclic ketones, etc.

The oxygen gas may be introduced as air or in admixture with another inert gas. It is within the scope of the invention to employ oxygen and nitrogen mixtures which contain either a greater or lesser oxygen partial pressure than that in air.

In general, the amount of boric acid employed should be in excess of the amount that would be stoichiometrically equivalent to the number of hydroxyl groups to be introduced. Since in the preferred embodiment of this invention it is generally desirable to effect only partial conversion in a single pass operation (although recycle and multi-stage operation are within the scope of the invention) the amount of boric acid added to a reaction mixture in such operation will be generally less than stoichiometric requirements for 100% conversion.

It should be understood that 1 mole of $H_3BO_3$, a tribasic acid, is considered as constituting three chemical equivalents. The same is true of the borate esters hereinbefore mentioned. Broadly speaking, the present invention gives useful results when employing concentrations of $H_3BO_3$ which fall in the range of about 0.02 to 3.0, preferably 0.03 to 0.5 moles of $H_3BO_3$ per mole of cyclic olefin.

The use of the higher portion of this range is particularly of interest when comparatively large quantities of inert diluent are used. It is within the scope of this invention to carry out the oxidation reactions of the organic compounds in the presence of an inert diluent or a solvent such as benzene, chlorobenzene, dichlorobenzene, bromobenzene, etc. Other diluents may be used such as carbon tetrachloride.

Although this process may be advantageously employed with any alicyclic olefin, it is particularly valuable with compounds having a large number of carbon atoms in the cyclic portion of the molecule, e.g. cyclododecene, since the process permits conversion to the alcohol as the principal product with little or no loss to ring cleavage. Other suitable feedstocks include $C_5$ to $C_{20}$ alicyclic olefins and alkyl substituted cyclic olefins wherein one or more hydrogen atoms attached to a carbon of the cyclic ring are replaced by a $C_1$–$C_4$ alkyl radical, e.g. methylcyclohexene, etc.

The process may be conducted at temperatures in the range of 100° to 250° C., preferably 130 to 185° C., and more preferably between 150° to 175° C. and at pressures ranging from 1 atmosphere or below to 200 atmospheres or higher, particularly atmospheric to 50 atmospheres.

The borate ester of the product alcohol may be converted to the corresponding alcohol by reaction with water or preferably with a lower molecular weight alcohol, e.g. $C_1$–$C_3$ alcohol, preferably methanol.

The following examples are for purposes of illustration and should not be construed as limiting the true scope of the invention as set forth in the claims.

EXAMPLE 1

A 45 gm. charge of cyclododecene (0.27 mole) is heated to 155°–165° C. and air passed through at the rate of 100–200 cc./min. After a short induction period, oxygen uptake is observed and then 2.5 grams $H_3BO_3$ (0.041 mole) are added. After 3½ hours, the air flow is stopped and the crude oxidation mixture is cooled and dissolved in 300 ml. of ether. The resulting solution is washed with a saturated $NaHCO_3$ solution, then 2% $Na_2CO_3$ solution and finally with water. After drying the ether is removed by evaporation. Product is distilled to remove unreacted cyclododecene. The over-all conversion is about 36%. The major product is cyclododecenol with a selectivity of about 50%. The alcohol is primarily 3-hydroxy cyclododecene. The other product is cyclododecene oxide with a 40% selectivity. The remainder of the material is ketone.

EXAMPLE 2

The procedure of Example 1 is repeated in the absence of boric acid using cyclooctene as the olefin feedstock and the selectivity of product is found to be as follows:

| | Percent |
|---|---|
| Epoxide | 55 |
| Alcohol and ketone | 15 |
| Others, including suberic acid, and its esters along with unidentifiable high molecular weight condensation products | 35 |

EXAMPLE 3

Example 1 is repeated and trimethylborate is employed in lieu of $H_3BO_3$. A pressure of 10 atmospheres and a temperature of 160° C. are used. A high selectivity to cyclododecenol is obtained again with no evidence of extensive ring cleavage or cracking.

EXAMPLE 4

Example 1 is repeated except that cyclooctene is employed as the olefin feed and cyclooctenol is recovered as product. Selectivity is about 50%.

EXAMPLE 5

Example 1 is repeated except for the following differences: boric oxide is employed in place of boric acid. A mixture of $O_2$ and nitrogen containing about 8 vol. percent air is employed as the oxidant. About 0.01 wt. percent (based on olefin) of cobalt naphthenate is added to the reaction mixture. The olefin feed is cyclododecene. Selectivity is approximately the same as in Example 1.

EXAMPLE 6

Example 1 is repeated except that no boric acid or boric acid compound is used. The selectivity to cyclododecene is extremely low.

What is claimed is:

1. A process for producing an unsaturated alicyclic alcohol which comprises contacting an alicyclic olefin with a molecular oxygen containing gas at a temperature in the range of 100° to 250° C. in the presence of a compound selected from the group consisting of boric acid and compounds which generate boric acid upon contact with water at said temperatures, and converting the resulting borate ester to form unsaturated alicyclic alcohol.

2. A process in accordance with claim 1 wherein said temperature is maintained in the range of 150° to 185° C.

3. A process in accordance with claim 1 wherein the process is carried out at a pressure in the range of 1 to 200 atmospheres.

4. A process in accordance with claim 1 wherein said alicyclic olefin is cyclododecene.

5. A process for producing an unsaturated alicyclic alcohol which comprises contacting an alicyclic olefin with a molecular oxygen containing gas at a temperature in the range of 100° to 250° C. in the presence of an ester of boric acid and a $C_1$ to $C_5$ alcohol, and converting the resulting borate ester to form said unsaturated alicyclic alcohol.

6. A process for producing an unsaturated alicyclic alcohol which comprises contacting an alicyclic olefin with a molecular oxygen containing gas at a temperature in the range of 100° to 250° C. in the presence of $B_2O_3$, and converting the resulting borate ester to form said unsaturated alicyclic alcohol.

7. A process for preparing an unsaturated alicyclic borate ester which comprises contacting an alicyclic olefin with a molecular oxygen containing gas in the liquid phase at a temperature of at least 100° C. for a sufficient period of time to produce said borate ester, said alicyclic olefin being in admixture with a compound selected from the group consisting of boric acid and boric oxide.

8. A process for partially oxidizing a $C_5$ to $C_{20}$ alicyclic olefin which comprises contacting said olefin with a molecular oxygen containing gas in the presence of 0.2 to 3.0 moles of boric acid per mole of said olefin at a temperature in the range of 150° to 185° C.

9. A process in accordance with claim 8 wherein said boric acid is employed at the rate of 0.03 to 0.5 moles of boric acid per mole of said olefin.

10. A process for producing an alicyclic alcohol which comprises introducing an alicyclic olefin and a triester of boric acid and a $C_1$–$C_5$ alcohol into a reaction zone maintained at a temperature in the range of 100° to 250° C. and passing molecular oxygen into said zone to oxidize said alicyclic olefin and form a borate ester and converting said borate ester to an alicyclic alcohol.

11. A process in accordance with claim 10 wherein said triester is trimethylborate.

12. A process in accordance with claim 10 wherein said temperature is in the range of 130 to 185° C.

13. A process in accordance with claim 10 wherein said molecular oxygen is introduced by passing air through said reaction zone.

References Cited by the Examiner

UNITED STATES PATENTS

| | | | |
|---|---|---|---|
| 1,947,989 | 2/1934 | Hellthaler et al. | 260—462 X |
| 2,721,180 | 10/1955 | Lawrence et al. | 252—49.6 |
| 2,721,181 | 10/1955 | Lawrence et al. | 252—49.6 |
| 2,769,017 | 10/1956 | Reppe et al. | 260—617 X |

OTHER REFERENCES

Bashkirov, Chem. Abstracts, 51:4027 (1957).
Kawai et al., Chem. Abstracts, 42:6737–38 (1948).
Scattergood et al., J. Am. Chem. Soc., vol. 67, page 2151, (1945).

CHARLES B. PARKER, *Primary Examiner.*

O. R. VERTIZ, *Examiner.*

H. G. MOORE, L. A. SEBASTIAN, REYNOLD J. FINNEGAN, DELBERT R. PHILLIPS,
*Assistant Examiners.*